(12) United States Patent
Hassell (10) Patent No.: US 7,830,257 B2
(45) Date of Patent: Nov. 9, 2010

(54) LONG-RANGE CATTLE IDENTIFICATION SYSTEM

(75) Inventor: John W. Hassell, Tulsa, OK (US)

(73) Assignee: The Board of Regents of the University of Oklahoma, Norman, OK (US)

(*) Notice: Subject to any disclaimer, the term of this patent is extended or adjusted under 35 U.S.C. 154(b) by 436 days.

(21) Appl. No.: 11/410,858

(22) Filed: Apr. 24, 2006

(65) Prior Publication Data

US 2007/0008150 A1 Jan. 11, 2007

Related U.S. Application Data

(60) Provisional application No. 60/673,962, filed on Apr. 22, 2005, provisional application No. 60/720,360, filed on Sep. 23, 2005.

(51) Int. Cl.
*G08B 13/14* (2006.01)
*G08B 23/00* (2006.01)
*G08B 1/08* (2006.01)
*A61B 5/00* (2006.01)

(52) U.S. Cl. .............. 340/572.1; 340/573.1; 340/539.1; 340/572.8; 340/539.22; 600/300

(58) Field of Classification Search .............. 340/572.1, 340/573.1
See application file for complete search history.

(56) References Cited

U.S. PATENT DOCUMENTS

| 3,713,148 A | 1/1973 | Cardullo et al. |
| 3,752,960 A | 8/1973 | Walton |
| 3,816,708 A | 6/1974 | Walton |
| 4,384,288 A | 5/1983 | Walton |
| 4,617,876 A * | 10/1986 | Hayes ................. 119/842 |
| 4,854,328 A * | 8/1989 | Pollack ................. 600/549 |
| 5,804,810 A * | 9/1998 | Woolley et al. ......... 235/492 |
| 5,907,491 A | 5/1999 | Canada et al. |
| 6,000,361 A * | 12/1999 | Pratt .................. 119/51.02 |
| 6,231,435 B1 | 5/2001 | Pilger |
| 6,329,920 B1 | 12/2001 | Morrison et al. |
| 6,342,839 B1 | 1/2002 | Curkendall et al. |
| 6,346,885 B1 | 2/2002 | Curkendall |
| 6,577,241 B2 | 6/2003 | Neidig et al. |
| 6,608,561 B2 | 8/2003 | Lawler, Jr. et al. |

(Continued)

OTHER PUBLICATIONS

Hegeman, Roxana, "Animal ID Program Combines GPS, Cell Tech, RFID", USA TODAY, pp. 1-3, 2005.

*Primary Examiner*—George A Bugg
*Assistant Examiner*—Jack Wang
(74) *Attorney, Agent, or Firm*—Dunlap Codding, P.C.

(57) ABSTRACT

A long-range cattle identification system used to monitor a plurality of animals. The system uses a plurality of electronic information tags that are attachable to animals. The electronic information tags transmit and receive electronic information with at least one other electronic information tag. The electronic information tags are spatially disposed so that one electronic information tag can transmit and receive at least one other electronic information tag's individual electronic information to form a mesh network. The system includes a communication device that can communicate with at least one electronic information tag and receive information from that tag. The communication device can also receive the information contained in all the other electronic information tags in the mesh network through the at least one electronic information tag.

7 Claims, 5 Drawing Sheets

U.S. PATENT DOCUMENTS

| | | | |
|---|---|---|---|
| 6,664,897 B2 | 12/2003 | Pape et al. | |
| 6,724,309 B2 | 4/2004 | Grose et al. | |
| 6,878,052 B2 | 4/2005 | Andersson | |
| 6,963,317 B2 | 11/2005 | Zuk et al. | |
| 6,967,563 B2 | 11/2005 | Bormaster | |
| 2002/0010390 A1* | 1/2002 | Guice et al. | 600/300 |
| 2003/0000479 A1 | 1/2003 | Starr | |
| 2003/0062001 A1 | 4/2003 | Andersson | |
| 2003/0177025 A1 | 9/2003 | Curkendall et al. | |
| 2003/0226522 A1 | 12/2003 | Thibault | |
| 2004/0155782 A1 | 8/2004 | Letkomiller et al. | |
| 2004/0174260 A1* | 9/2004 | Wagner | 340/568.1 |
| 2005/0145187 A1 | 7/2005 | Gray | |
| 2006/0071786 A1* | 4/2006 | Fano | 340/539.22 |
| 2006/0114102 A1* | 6/2006 | Chang et al. | 340/10.1 |
| 2006/0125627 A1* | 6/2006 | Gardner et al. | 340/539.1 |
| 2006/0176179 A1* | 8/2006 | Skorpik et al. | 340/572.8 |
| 2007/0029381 A1* | 2/2007 | Braiman | 235/385 |

* cited by examiner

LONG-RANGE CATTLE IDENTIFICATION SYSTEM

CROSS-REFERENCE TO RELATED APPLICATIONS

The present patent application claims priority to the provisional patent application identified by U.S. Ser. No. 60/673,962 filed on Apr. 22, 2005; as well as the provisional patent application identified by U.S. Ser. No. 60/720,360 filed on Sep. 23, 2005. The entire content of both of the afore mentioned provisional patent applications is hereby incorporated herein by reference.

STATEMENT REGARDING FEDERALLY SPONSORED RESEARCH AND DEVELOPMENT

Not applicable.

BACKGROUND OF THE INVENTION

Existing electronic identification methods of cattle rely on traditional radio frequency identification (RFID) devices. With these devices, a wand must be passed nearby (typically within one meter) each animal's ear tag. The short reading range of the existing RFID devices mandated corralling and trapping individual animals. In order to accomplish this, the rancher traps each animal one by one in a working chute. This activity is time consuming and stressful to the cattle. For this reason, producers are generally limited to reading the electronic identification of each animal when scheduled vaccinations or other veterinary practices are required of the entire herd.

Another limitation of the passive RFID devices is that they require inductive, close proximity electromagnetic radiation for power. The wands and panels that supply this inductive power are typically very expensive.

DETAILED DESCRIPTION OF THE INVENTION

Presently preferred embodiments of the invention are shown in the above identified figures and described in detail below. In describing the preferred embodiments, like or identical reference numerals are used to identify common or similar elements. The figures are not necessarily to scale and certain features in certain views of the figures may be shown exaggerated in scale the interest of clarity and conciseness.

Figure 1:
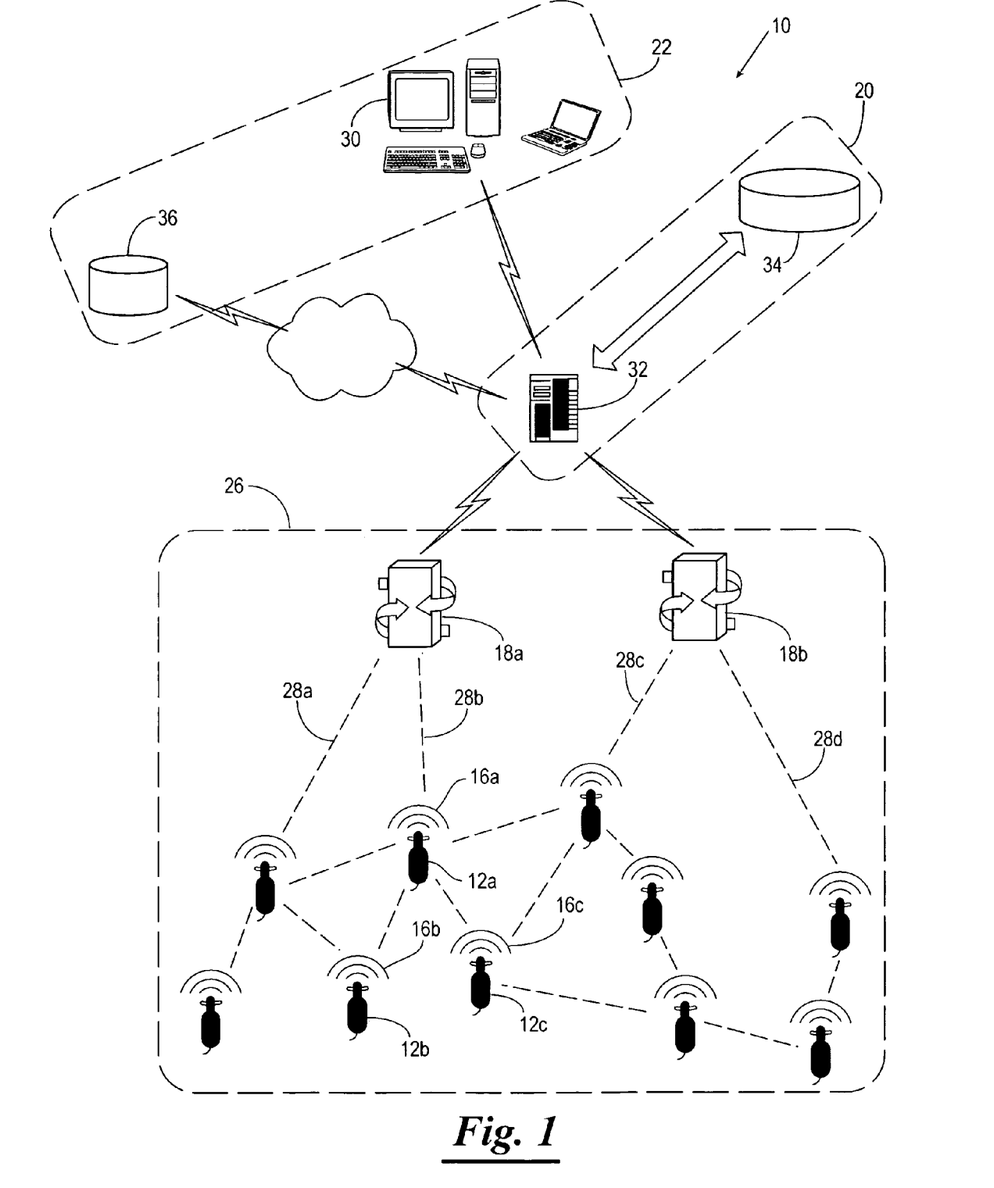
FIG. 1 is a schematic diagram of a long-range animal identification system constructed in accordance with the present invention.

Referring now to the drawings, and in particular to FIG. 1, shown therein and designated by reference numeral 10 is a long-range animal identification system constructed in accordance with the present invention. For purposes of clarity, the long-range animal identification system 10 will be referred to hereinafter as the "system 10". The system 10 serves to monitor a plurality of animals 12, only three of the animals 12 being labeled in FIG. 1 by reference numerals 12a, 12b, and 12c for purposes of clarity. The animals 12 can be livestock or wild animals. Examples of livestock include beef cattle, sheep, ostriches, chickens, pigs or buffalo. Examples of wild animals include elk, deer, turkey, bears, fish or the like. For purposes of example, the following disclosure primarily discusses the system 10 being used to tag and track beef cattle. Because of homeland security food safety issues, and the advent of mad cow disease, there is a high level of interest in the electronic tracking of individual beef cattle.

Figure 3:
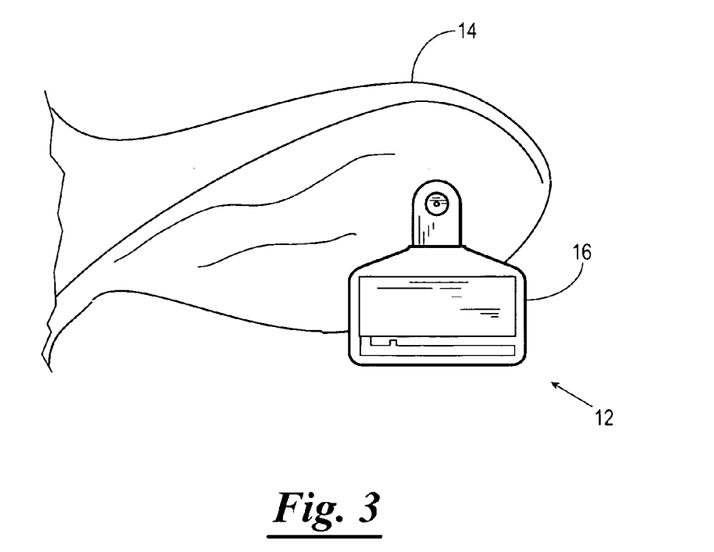
FIG. 3 is a perspective view of an exemplary electronic information tag, constructed in accordance with the present invention, connected to an ear of an animal.

The system 10 is provided with a plurality of electronic information tags 16, one or more communication devices 18, such as transponders or readers, a backend database 20, and a plurality of user systems 22. An example of the electronic information tags 16 is depicted in FIG. 3. At least one of the electronic information tags 16 is attachable to each animal 12. The electronic information tags 16 are represented in FIG. 1 by way of a set of three curved lines only three of the electronic information tags 16a, 16b, and 16c are labeled in FIG. 1 for purposes of clarity. The electronic information tag 16a is attached to the animal 12a, the electronic information tag 16b is attached to the animal 12b, and the electronic information tag 16c is attached to the animal 12c.

Each electronic information tag 16 transmits and receives electronic information with at least one other electronic information tag 16. As shown in FIG. 1, the electronic information tags 16 are spatially disposed such that one of the electronic information tags 16 can transmit and receive at least one other electronic information tag's (such as the electronic information tag 16b) individual electronic information to form a mesh network 26. The mesh network 26, which will be described in more detail below, is shown in FIG. 1 by way of the dashed lines.

By way of example, two of the communication devices 18 (which are labeled by the reference numerals 18a and 18b for purposes of clarity) are shown in FIG. 1. The communication devices 18a and 18b communicate with at least one electronic information tag 16 and receive information from the at least one electronic information tag 16 and from all the other electronic information tags 16 in the mesh network 26 through the at least one electronic information tag 16. For example, assuming that the communication device 18a is communicating with the electronic information tag 16a, information from the electronic information tags 16b and 16c will be collected and transmitted to the communication device 18a through the electronic information tag 16a. The mesh-networking technology allows information to relay from tag 16 to tag 16, resulting in an effective range of hundreds or thousands of meters for each tag 16.

As shown in FIG. 1, more than one of the electronic information tags 16 can communicate directly with each of the communication devices 18 as indicated by the communication links 28a, 28b, 28c, and 28d. The communication links 28a-d are air way communication links, such as radio frequency or optical links.

The backend database 20 provides information collected from the electronic information tags 16 via the communication devices 18 to a variety of user systems 22 so as to act as a mediator, security gateway, and database interface between users, such as cattle buyers, producers, sellers, and governmental databases. In the example depicted in FIG. 1, the backend database 20 is implemented as a middleware server tier 32, and a backend database tier 34. The middleware server tier 32 is adapted to function as a web server so as to permit interaction with the user systems 22 by way of web services and/or the internet. It should be understood that the middleware server tier 32 does not have to be implemented as a web server.

The user systems 22 can be implemented in various manners, such as a third-party database system 36, or a third-party internet user system 30, such as an internet terminal which can be implemented in a variety of manners such as a personal computer, personal data system, cell phone or the like. The third party database 36 can be a national animal identification system database and/or a third-party database system, for example. The system 10 desirably adds a real-time monitoring and updating dimension to every tier of existing animal 12 identification database schemes. With the real-time, on-range, monitoring ability provided by the tags 16, users of the communication devices 18 have the ability to receive more timely notification of stray, dead, or stolen animals 12.

The system 10 can be used to monitor animals by the user of the user system 22. The user can be, for example, a cattle buyer, a producer, a seller, and/or a government database. Initially, electronic information tags 16 are attached to a plurality of animals 12. Each animal 12 is equipped with its own electronic information tag 16 which cooperates to create the mesh network 26. Then one or more communication devices 18 are positioned within a range, normally within 100 meters, of at least one of the animals 12 having at least one of the electronic information tags 16 attached thereto. The communication devices 18 can be positioned in any manner that places them within a range of the animals 12. The user can then determine the number of tags 16 (or animals 12) within the mesh network 26. It is preferable to mount communication devices 18 to fixed locations within a preselected area, such as a feeding area, pond, watering area, or the like. The stored electronic information from the tags 16 can be monitored to determine whether or not the animals 12 are coming within range of the communication devices 18 that are mounted in a fixed location. The communication devices 18 can also be carried by a user and manually actuated. Once actuated within range of one of the electronic information tags 16, the communication devices 18 receives, or polls, information for all the tags 16 within the mesh network 26.

Figure 2:
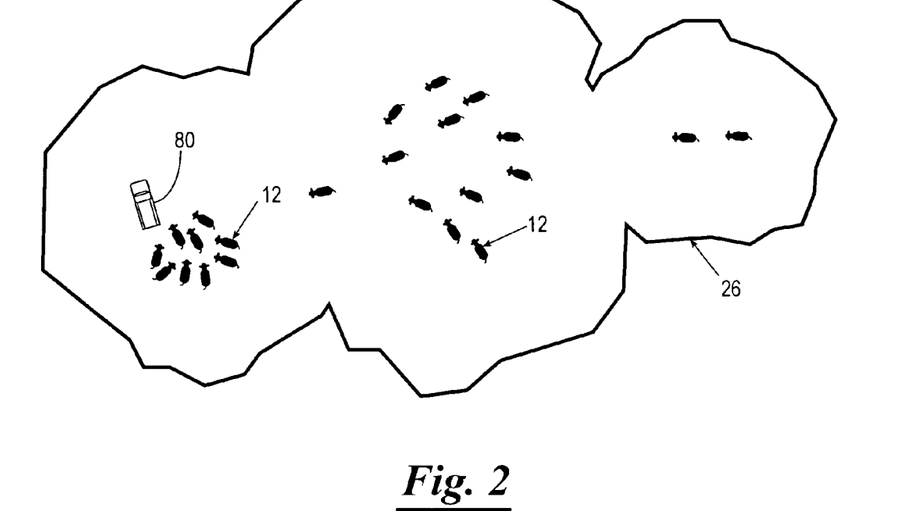
FIG. 2 is a schematic diagram illustrating a mesh network formed by the positions of various animals monitored by the long-range animal identification system depicted in FIG. 1.

FIG. 2 illustrates the mesh network 26 formed by the positions of various animals 12 monitored by the long-range animal identification system 10. The mesh network 26 is an always changing area. That is, as animals 12 get closer to each other and farther apart the mesh network 26 contracts and expands. A user of the communication device 18 can receive, such as poll, information for any tags 16 within the mesh network 26 so long as the communication device 18 can communicate with one of the electronic information tags 16. The communication device 18 receives the data from the tags 16, and can record or display the related data. A feed truck 80, shown in FIG. 2, represents a user of a communication device 18. The feed truck 80 can take the communication device 18 into the pasture as shown, by a feedlot, on a road that goes by a pasture, or within a range of any area where animals 12 are kept.

Traditionally, the tracking of beef cattle has been achieved through short-range (less than 2 meters) radiofrequency identification tags. The short-range introduced crippling limitations in the use of radiofrequency identification tags. The long-range animal identification system 10, on the other hand, extends the range to hundreds of meters. In one preferred embodiment, the system 10 uses a mesh-radio network technology to permit transmission of signals from tags 16 connected to the animals 12 such that the tags 16 serve to relay 1) requests for information from a communication device 18 and 2) the answers from the tags 16 to the communication device 18. Utilizing this technology, the range for detecting individual tags 16 can be extended to hundreds of meters, even though the individual transmitting/receiving ability of the tags 16 is limited to a much smaller range, such as 100 m.

The system 10 is based on the premise that each of the animals will have the electronic information tag 16 attached thereto.

Shown in FIG. 3-9 are examples of an electronic information tag 16 constructed in accordance with the present invention. In this example, the electronic information tag 16 is configured to attach to the ear 14 of an animal 12. It should be understood that the tag 16 could be adapted for attachment to another part of the animal 12.

Figure 4:
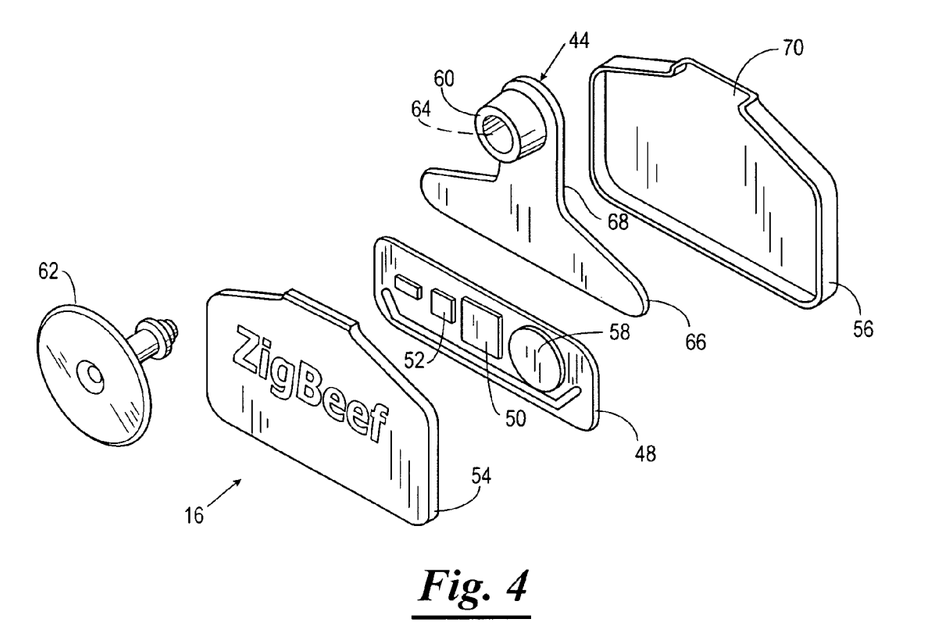
FIG. 4 is a perspective, exploded view of the electronic information tag depicted in FIG. 3.
Figure 5:
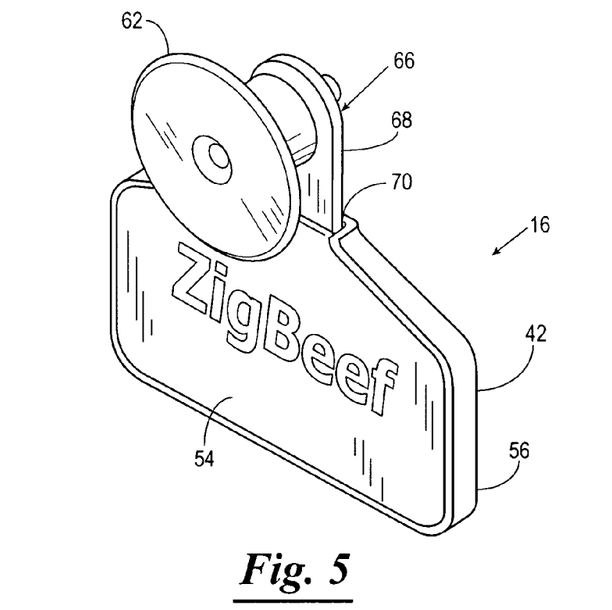
FIG. 5 is a perspective view of the electronic information tag in an assembled form.
Figure 6:
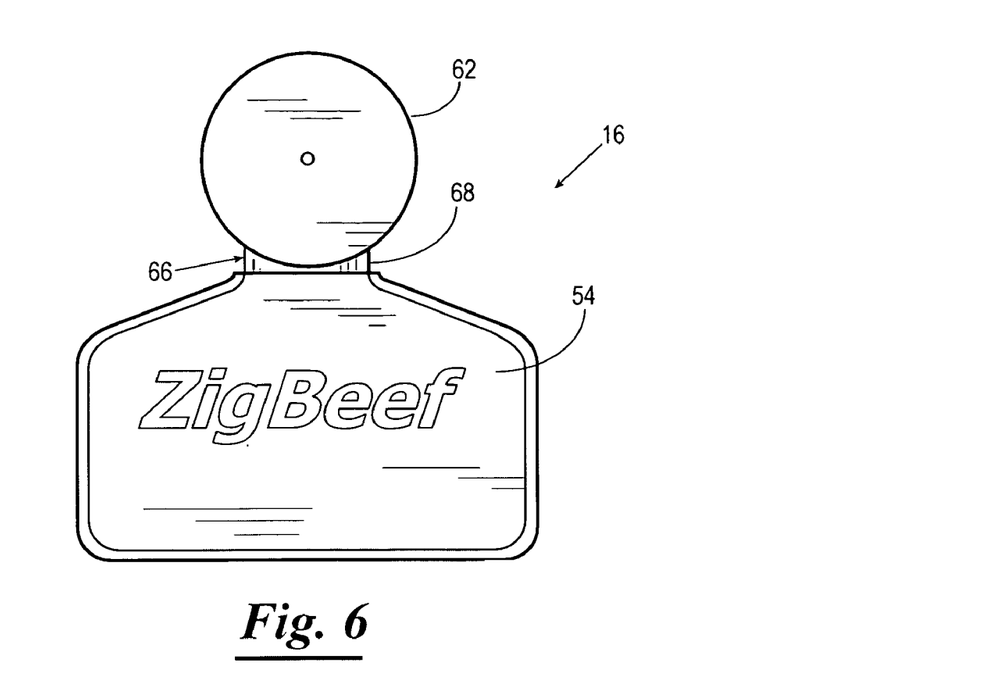
FIG. 6 is a side elevational view of the electronic information tag.
Figure 7:
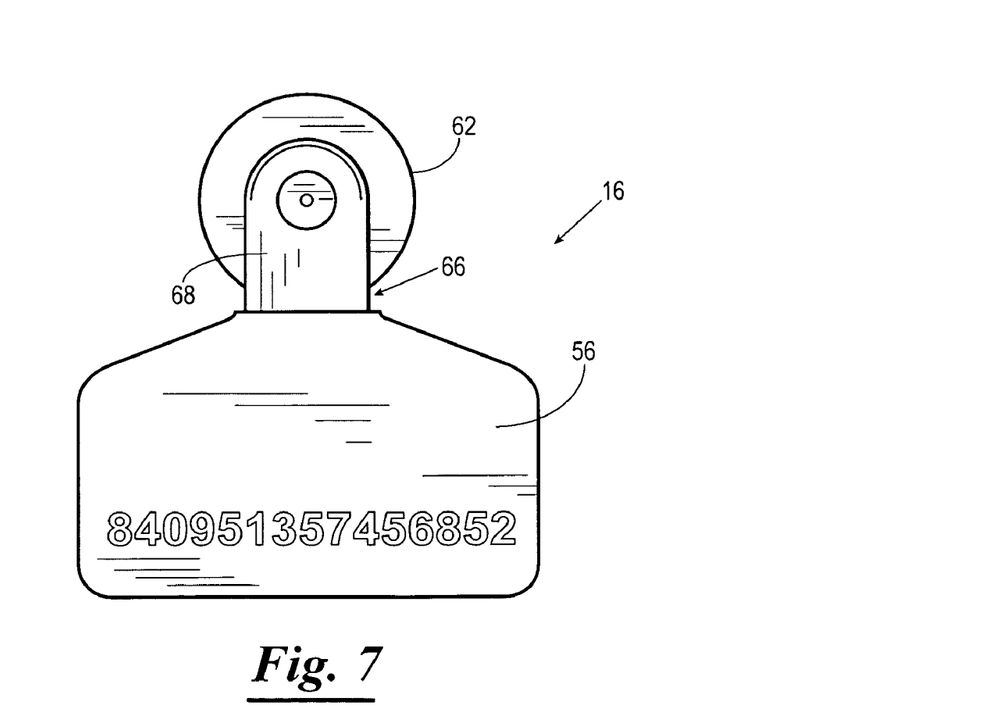
FIG. 7 is another side elevational view of the electronic information tag, generally opposite that shown in FIG. 6.
Figure 8:
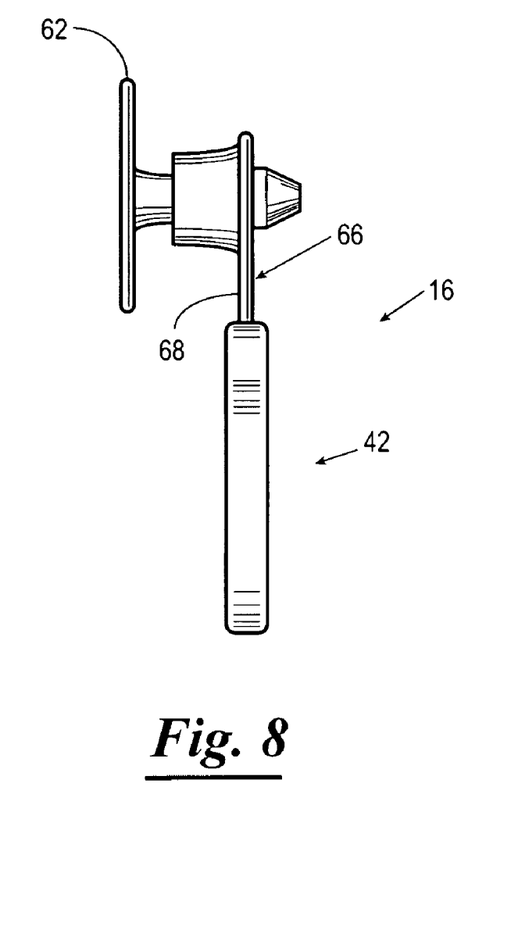
FIG. 8 is an end view of the electronic information tag.
Figure 9:
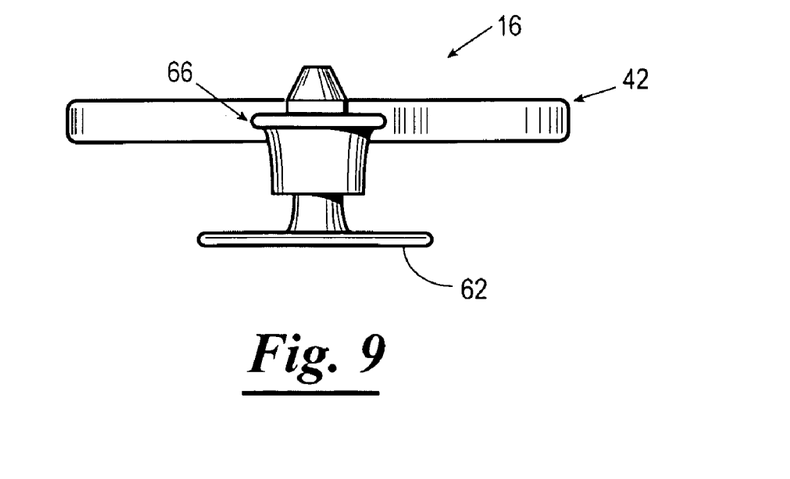
FIG. 9 is a top plan view of the electronic information tag.

In particular, FIG. 4 illustrates a perspective, exploded view of the electronic information tag 16. The electronic information tag is constructed of a housing 42, and a connector portion 44. The housing 42 encapsulates a circuit board 48, a wireless sensor networking chip 50, and an electronic memory 52. The electronic memory 52 can be used to store algorithms for supporting software and to store electronic information, such as premise identification data, ownership data, and/or unique identification data. The housing 42 can also include a power source 58, such as a battery, solar power, vibrational power, or the like. The power source 58 is used to supply power to the wireless sensor networking chip 50, which is mounted on the circuit board 48. Additionally, the housing 42 can include various electronic and/or optical components to form a transmitter/receiver capable of operating in the manner described. In one embodiment, not shown in any figure, the power source 58 is not included inside the housing 42 of the electronic information tag 16.

As defined above, the electronic information tag 16 can store premise identification data, ownership data, and/or unique identification data. The premise identification data is utilized to identify the origination information of an animal 12 and is updated each time the premise of the animal 12 changes to form a premise history of the animal 12. Similarly, the ownership data identifies the owner of an animal 12 and is updated when the ownership of the animal 12 changes to form an ownership history. The ownership data can also include, but is not limited to, animal lineage, veterinary records, premise history, and marketing data. The unique identification data identifies the particular animal 12 upon which the electronic information tag 16 is connected. In one preferred embodiment, the wireless sensor networking chip 50 permits communication between at least one communication device 18 and the other electronic information tags 16 discussed herein. A suitable wireless sensor networking chip has been found to be a MC13193 integrated chip obtainable from Freescale Semiconductor having a principal place of business in Austin, Tex.

The housing 42 can be constructed in any manner capable of encapsulating the circuit board 48, the wireless sensor networking chip 50, and the electronic memory 52, and of being connected to the animal 12 by the connector portion 44. For example, it should be understood that the housing 42 can be provided with any suitable shape or configuration and the configuration shown in FIG. 4 is merely an example. The housing 42, in one preferred embodiment, is constructed of a front panel 54 and a rear panel 56. The front panel 54 connects to the rear panel 56 so as to encapsulate the circuit board 48, the wireless sensor networking chip 50, and the electronic memory 52. Although in one preferred embodiment the front panel 54, and the rear panel 56 are constructed of plastic, it should be understood that the front panel 54 and the rear panel 56 can be constructed of any material which does not interfere with the operation of the circuit board 48, the wireless sensor networking chip 50, or the electronic memory 52. The front panel 54 can be connected to the rear panel 56 by any suitable manner capable of protecting the circuit board 48, the wireless sensor networking chip 50, and the electronic memory 52 from external elements, such as dust and rain. For example, the front panel 54 can be connected to the rear panel 56 by way of snaps, epoxy, solder, welds, or the like.

The connector portion 44 can be constructed in any manner capable of permitting connection of the housing 42 to the animal 12. For example, in the preferred embodiment depicted in FIG. 4, the connector portion 44 is provided with a receiver 60 and an attachment member 62. The receiver 60 defines an opening 64 capable of receiving a portion of the attachment member 62 so as to securely grip the attachment member 62 and prevent the attachment member 62 from being removed from the receiver 60. The receiver 60 is also provided with a flange 66 which is designed to be positioned within the housing 42 such that a neck 68 of the receiver 60 extends through an opening 70 provided in the housing 42. The flange 66 is larger than the opening 70 so as to prevent removal of the flange 60 from the housing 42 once the front panel 54 and the rear panel 56 are connected together.

In a preferred embodiment the wireless sensor networking chip 50 is configured to work in the mesh network system 26 using tag-to-tag relaying of the electronic information. The wireless sensor networking chip 50 can be accessed by the communication device 18. The wireless sensor networking chip 50 of the electronic information tag 16 of FIGS. 3-9 can be configured in two distinct activity modes; a range mode and a highly responsive mode. When the chip 50 is configured in the range mode it listens on relatively infrequent occasions, such as once every five minutes. When the tag 16 is configured in the highly responsive mode it listens much more frequently, such as once a second. Desirably, the user of the communication device 18 has the ability to switch the tags 16 from one mode to another.

The majority of an animal's 12 life is spent grazing on pasture or standing in large feedlots. In these settings, the tags 16 will spend most of their time in a low battery drain "range" mode. In this mode, it is envisioned the tags 16 will only listen every 5 minutes or so for a command from one of the communication devices 18. Commands from the communication device 18 could include an order for the tag 16 to respond with requested information, to return to low-power sleep mode, or to enter into the "highly responsive" mode. This highly responsive mode is appropriate for situations in which the tag 16 must respond rapidly to a request from the communication device 18. This mode is needed for situations in which animals 12 may be running rapidly by one of the communication devices 18 or at times in which electronic information is to be collected rapidly from a large group of animals 12. Configuration of these modes can be initiated by a person issuing a command through the wireless network or automatically through an unattended device on the wireless network.

When the chip 50 is implemented as the MC13193 integrated chip, the energy requirement calculation for the "range" mode of power consumption considers the battery drain during the sleep cycle with the power used during the active RF cycle. During the sleep cycle, the chip 50 still draws approximately 7 μA of current. During the "awake" portion of the cycle, the radio of the chip 50 will go through a cycle consisting of a clear-channel assessment, a packet transmit, and then enter a receive mode. This CCA-TX-RX radio cycle is predicted to consume 45 mA of current.

Use of a typical 32.768 kHz crystal dictates a 1 sec time tick between wakeup to wakeup in order to increment a software timer. The estimated time for MCU wakeup and return to sleep is 200 μsec at 4 mA. Thus, for one second in the sleep cycle:

$$1 \text{ sec sleep cycle current load} \square 1 \text{ sec} \times 7 \mu A + 200 \mu \text{sec} \times 4 \text{ mA} \quad (0.1)$$

$$\square 7.8 \mu A \text{ sec}$$

For a five-minute sleep cycle:

$$5 \text{ minute sleep cycle current load} \square \frac{60 \text{ sec}}{\text{min}} \times 5 \text{ min} \times \frac{7.8 \mu A \text{ sec}}{\text{sec}} \quad (0.2)$$

$$\square 2.34 \times 10^3 \mu A \text{ sec}$$

Once every five minute sleep cycle, the CCA-TX-RX radio cycle is executed with a power load of:

$$CCA - TX - RX \text{ current load} = 5 \text{ msec} \times 45 \text{ mA} \quad (0.3)$$

$$= 225 \mu A \text{ sec}$$

The total five minute load is thus given by:

$$\text{Total load for 5 minutes of range mode} = 2.34 \times 10^3 \mu A \text{sec} + 225 \mu A \text{ sec} \quad (0.4)$$

$$= 2.57 \times 10^3 \mu A \text{sec}$$

In the "highly responsive" mode, the tag chip 50 listens for a request from the communication device 18 very often, say once every second. This mode is identical in power profile to the previously presented "range" mode except that the CCA-TX-RX is performed every second, instead of every five minutes. The power required for 5 minutes spent in the highly responsive mode is thus:

$$\text{Total load for 5 minutes of highly responsive mode} = 300 \sec \times \frac{(\text{sleep cycle load} + \text{"}CCA - TX - RX \text{ load"})}{\sec} \quad (0.5)$$

$$= 300 \times (7.8 \,\mu\text{Asec} + 225 \,\mu\text{Asec})$$

$$= 70 \times 10^3 \,\mu\text{Asec}$$

Each day is composed of 288 five-minute periods. The average lifespan of a meat producing beef animal 12 in the U.S. is 2.5 years. Accordingly, a 3 year lifespan for tag 16 battery life is desired. Given:

$$1 \text{ milliAmp Hour (mAH)} = 3.6 \times 10^6 \,\mu\text{A sec} \quad (0.6)$$

If the tags 16 enter the highly responsive mode once every day for a five minute period of time and remain in range mode the remainder of the time, then over a 3 year lifespan of an animal 12 the power load for the device is:

$$\text{Projected 3 year battery drain} = 3 \text{ years} \times \frac{365 \text{ days}}{\text{year}} \quad (0.7)$$

$$(287 \times 2.57 \times 10^3 \,\mu\text{Asec} + 1 \times$$

$$70 \times 10^3 \,\mu\text{Asec})$$

$$= 884 \times 10^6 \,\mu\text{Asec} = 245 mAH$$

This is well below the CR3032 coin cell's 500 mAH capacity. Because most beef cattle are not checked or inspected every day, the once-a-day figure given for the highly-responsive mode is liberal. However, there will be occasions during the life of the animal 12 in which the tag 16 will be placed in the highly-responsive mode multiple times during the day, such as in an auction sale situation. In addition, it may be desirable to have the tag 16 in the highly-responsive mode for longer than a five-minute period. If the tag 16 were kept in the highly responsive mode all day, the current drain would only be 5.6 mAH. This is equal to approximately 1% of the total battery capacity of the CR3032 coin cell.

Another embodiment of this invention provides a method of recording data onto the tag 16 which is configured to attach to one of the animals 12. One step in this method is to attach the tag 16 to one of the animals 12. Then one of the communication devices 18 is used to record electronic information onto the tag 16. The tags 16 can be configured to store various types of electronic information on the tag's 16 electronic memory 52. The electronic memory can store software for the wireless sensor networking chip 50 or store identification data, such as premise identification data, ownership data, unique identification data, or any user-defined data.

Another embodiment of the present invention provides a method of making the tag 16 for attachment to one of the animals 12. In this method, the wireless sensor networking chip 50 is mounted to the circuit board 48 and then the circuit board 48 is installed into the housing 42. The power source 58 and the electronic memory 52 are also installed into the housing 42 to supply the wireless sensor networking chip 50 with power.

Changes may be made in the construction and the operation of the various components, elements and assemblies described herein and changes may be made in the steps or the sequence of steps of the methods described herein without departing from the spirit and scope of the present invention. Other objects, features and advantages of the present invention are apparent from the detailed description when read in conjunction with the following claims and attached drawings.

The invention claimed is:

1. A method for making a tag system for attachment to a plurality of animals, comprising the steps of: making a plurality of electronic information tags, with each tag attachable to a different animal and each tag made by the process of: installing a circuit board in a housing configured to be attached to an animal; mounting a wireless sensor networking chip to the circuit board, the wireless sensor networking chip being configured to work in a mesh network using tag-to-tag relaying of electronic information between tags attached to different animals; and installing an electronic memory to communicate with the wireless sensor networking chip to store algorithms for supporting software and to store the electronic information.

2. The method of claim 1, wherein communication devices are mounted to fixed locations, within a preselected area, so as to accumulate electronic information from the electronic information tags.

3. A method for making a tag system for attachment to a plurality of animals, comprising the steps of:
   making a plurality of electronic information tags, with each tag attachable to a different animal and each tag made by the process of:
   installing a circuit board in a housing configured to be attached to an animal;
   mounting a wireless sensor networking chip to the circuit board, the wireless sensor networking chip being configured to work in a mesh network using tag-to-tag relaying of electronic information between tags attached to different animals;
   installing a power source in the housing to supply the wireless sensor networking chip with power; and
   installing an electronic memory to communicate with the wireless sensor networking chip to store algorithms for supporting software and to store the electronic information.

4. A method for recording data onto a tag system for a long-range animal identification system, the method comprising the steps of:
   attaching tags to a plurality of animals such that each animal has a tag attached thereto, wherein the tags comprise a housing encapsulating a circuit board, a wireless sensor networking chip configured to work in a mesh network using tag-to-tag relaying of electronic information, a power source, and an electronic memory used to store the electronic information, the mesh network encompassing multiple animals; and using a communication device to record the electronic information onto the tag.

5. The method of claim 4, wherein the electronic information comprises premise identification data.

6. The method of claim 4, wherein the electronic information comprises ownership data.

7. The method of claim 4, wherein the electronic information comprises identification data to identify a particular animal upon which the tag is connected.

* * * * *

UNITED STATES PATENT AND TRADEMARK OFFICE
CERTIFICATE OF CORRECTION

PATENT NO. : 7,830,257 B2
APPLICATION NO. : 11/410858
DATED : November 9, 2010
INVENTOR(S) : John W. Hassell It is certified that error appears in the above-identified patent and that said Letters Patent is hereby corrected as shown below:

In the Claims:
Column 8, lines 24-36: Delete Claim 1 in its entirety and replace with
-- A method for monitoring a plurality of animals, comprising the steps of:
    attaching electronic information tags to a plurality of animals, wherein each animal has a tag attached thereto, the electronic information tags being configured to work in a mesh network using tag-to-tag relaying of the electronic information so as to create the mesh network; and
    positioning a communication device within a range of at least one of the animals having at least one of the tags to determine the number of tags that are within the mesh network. --

Column 8, lines 53-54: Delete "installing a power source in the housing to supply the wireless sensor networking chip with power;"

Signed and Sealed this
Twenty-fourth Day of April, 2012

David J. Kappos
*Director of the United States Patent and Trademark Office*